(12) United States Patent
Horng et al.

(10) Patent No.: US 6,738,788 B1
(45) Date of Patent: May 18, 2004

(54) DATABASE SYSTEM USING A RECORD KEY HAVING SOME RANDOMLY POSITIONED, NON-DETERMINISTIC BITS

(75) Inventors: Chi-Song Horng, Palo Alto, CA (US); Keith Lofstrom, Beaverton, OR (US)

(73) Assignee: ICID, LLC, Palo Alto, CA (US)

( * ) Notice: Subject to any disclaimer, the term of this patent is extended or adjusted under 35 U.S.C. 154(b) by 20 days.

(21) Appl. No.: 10/124,860

(22) Filed: Apr. 17, 2002

(51) Int. Cl.[7] ............................................. G06F 17/30
(52) U.S. Cl. .................................... 707/104.1; 707/101
(58) Field of Search ............................... 707/1, 2, 3, 4, 707/5, 6, 7, 8, 9, 10, 104.1; 257/202

(56) References Cited

U.S. PATENT DOCUMENTS

| | | | |
|---|---|---|---|
| 5,933,820 A | * | 8/1999 | Beier et al. ..................... 707/1 |
| 6,498,361 B1 | * | 12/2002 | Osann, Jr. ................... 257/202 |

\* cited by examiner

*Primary Examiner*—Diane D. Mizrahi
*Assistant Examiner*—Yicun Wu

(74) *Attorney, Agent, or Firm*—Daniel J. Bedell; Smith-Hill and Bedell

(57) ABSTRACT

A database system accesses database records referenced by a binary number key having two fields, a typeID field containing only deterministic bits, and a uniqueID field permissibly containing one or more non-deterministic bits at any bit positions therein. The database system maintains a set of databases, each being identified by a separate value of the typeID field of the binary number key. The records of each database are allocated among a plurality of bins, with each bin being identified (keyed) by separate value of a binID field, and with each record being identified (keyed) by a separate value of a recID field. The database system locates a record of interest referenced by the binary number key by first selecting a particular one of the databases that is identified by the typeID field of the binary number key. It then compares a portion of selected bits of the binary number key's uniqueID field to binID values identifying bins of the selected database to determine a subset of the bins that may include the record of interest. The database system then compares the full uniqueID field of the binary number key to the recIDs values for records of the subset of bins to determine which particular recID field identifies the record of interest.

14 Claims, 2 Drawing Sheets

US 6,738,788 B1

DATABASE SYSTEM USING A RECORD KEY HAVING SOME RANDOMLY POSITIONED, NON-DETERMINISTIC BITS

BACKGROUND OF THE INVENTION

1. Field of the Invention

The present invention relates in general to a system for storing and retrieving data in database records referenced by binary number keys having a few randomly-placed, non-deterministic bits.

2. Description of Related Art

U.S. Pat. No. 6,161,213 issued Dec. 12, 2000 to Lofstrom (incorporated herein by reference) describes an identification (ID) generation circuit embedded in an integrated circuit (IC) chip for generating a binary bit pattern that can serve as a chip ID. The ID generation circuit makes use of randomly occurring parametric variations inherent in the integrated IC manufacturing process when generating the ID in a way that ensures that the ID is highly likely to be unique for each IC chip in which the ID generation circuit is embedded, even though the same set of masks are used when fabricating the ID generation circuit in a large number of ICs. The ID generation circuit, which can be employed for example in any standard sub-micron CMOS process, does not require technologies such as EPROMs, flash memories, or poly fuses, or post fabrication techniques such as laser-trimmed fuses or links. These alternatives typically require more complex manufacturing process steps. Furthermore, each individual IC chip must be separately processed after manufacturing in order to load a unique ID into each IC chip. Since the embedded IC generation circuit requires no additional manufacturing process steps or expensive machinery to separately program each IC chip, the chip ID system it provides is less expensive to implement than other approaches.

The embedded ID generation circuit produces its output ID pattern based on the binary outputs of an array of ID cells, wherein each cell output is a function of random process variations in doping of transistor channels within the cell. Due to the analog nature of the transistor operating characteristic each cell measures when determining the state to which it sets its output bit, and due to such other effects as thermal and system noise, among the ID bits produced by the chip's ID circuit cells, a very small percentage of the bits of the chip ID may be "non-deterministic" in the sense that the cells do not always set their output bits to the same value each time they generate them. Thus sometimes a particular bit of an ID read out of an IC chip will be set to a "0", while other times the bit will be set to a "1". The bit locations within a cell's ID where such bit "drifting" might occur are randomly distributed across the IDs for a large collection of ICs. However while a few of the bits of any particular IC chip's ID may drift in this manner, if the ID is sufficiently large, the great majority of the bits of the ID are "deterministic" in that they will always have the same value whenever the ID generation circuit generates the chip's ID.

Thus by making the number of bits in the ID sufficiently large, the ID for any one IC chip can be statistically guaranteed, with a high degree of certainty, to be uniquely distinct from IDs generated by millions of other IC chips, even though all of the chips employ the same ID circuit to generate their IDs, and even though some of the bits of many of the IDs may drift.

Lofstrom teaches that given a population of previously retrieved non-deterministic IDs such as would be generated by ID generation circuits embedded in a large collection of IC chips, and given an incoming ID newly acquired from one IC, the new ID can be compared with the previously retrieved IDs to determine whether the new ID came from one of the collection of IC chips. Lofstrom further teaches that, if so, the identity of the IC chip from which the incoming ID can be determined even in the presence of bit drifting. One example technique for comparing ID bit patterns involves computing an absolute norm (also called the "Hamming Distance", or "HD") between the two ID bit patterns. The HD of any two bit patterns is simply the number of bit positions where the two ID patterns differ. In accordance with the technique, the HD between two chip ID bit patterns are compared with a predefined HD threshold $HD_{th}$, and when the HD is less than $HD_{th}$, then the two chip IDs must have come from the same IC, otherwise, they must have come from two separate ICs. This technique shall be referred to herein as the "HD-Matching" technique, and when two chip IDs have an HD less than $HD_{th}$, they are considered to exhibit an "HD-Match", as the term is used herein below.

An ID key produced by the embedded ID generation circuit may consist of two fields: a "typeID" field in which all bits are programmed at the mask level so that they are the same for all IC chips of the same type, and a "uniqueID" field that is generated by the aforementioned cells and which is unique for each chip. The appropriate bit width of the uniqueID field of the chip ID needed to ensure that all chips of the same type will have unique IDs depends largely on the number of chips of that type to be produced and the number of bits that can be expected to be non-deterministic.

An array of IC dice are typically manufactured on a wafer and then separated to form individual IC chips. However integrated circuit manufacturers test and make measurements on various operating parameters of the ICs while they are still in wafer form by using probes to access input/output pads on the surfaces of the die. When an IC tester tests ICs having the embedded ID generation circuits, it can also read out their IDs and store them in a database containing other information about the ICs. The ID read out of each die can serve as the unique, permanent identification for that particular die, throughout its life from "birth to death", as the die passes through the various wafer-level measurement, testing, and burn-in processing steps, chip-level packaging and final testing, shipment to distributors and end-users, and assembly and use in an end-system, until the chip fails or is discarded.

It would be helpful to provide a database in which information about each chip could be stored in one or more databases, in records keyed to the chip's ID, so that the information could be retrieved when needed. However the difficulty in using a conventional database to store and retrieve information about the chip, is that some of the chips' ID's can have a few non-deterministic bits in randomly distributed bit locations. A conventional database system can only store a record using a key of a particular (fixed) value, and it can only retrieve that record if it is queried with a key having exactly the same value as the key under which the record was stored. Due to the non-deterministic nature of one or more bits of the ID read out of some of the IC chips, an ID newly read out of an IC chip may not exactly match any of the IDs previously read out of that same chip and supplied to the database when the database stored the information in the database. Thus using the ID read out of the chip as a key, a conventional database requiring deterministic ID keys will not be able to locate all of the records relating to a particular IC.

Even if a conventional database is retrofitted to deal with non-deterministic keys due to bit drifting, for example, by conducting the aforementioned HD-matching operation while trying to determine a key match, it still faces an efficiency problem. Conventional databases use such techniques as indexing, hashing, and the various sorting/searching schemes using the record keys to store and locate data records. But when presented with a new, potentially drifting key, all the indexing, hashing, and search techniques will break down. One way to resolve the problem is to create a record for each IC chip using the ID it generated when the record was first created as a key to the storage location of the record in the database. The keys to records for all chips are stored in a list. Thereafter, whenever it is necessary to read or write access the IC's record, the chip ID is read out of the IC and compared to each successive chip ID on the list until an HD-matching chip ID is found. The difficulty with such an approach is that it requires the database system to compare the chip's newly output ID to, on average, one half of the chip IDs in the database. This can be very time-consuming when the database includes records for a large number of IC chips. What is needed is a database system that can make use of a binary number having a few randomly-positioned, non-deterministic bits as a key for identifying records, and yet be able to quickly determine which record each key references.

BRIEF SUMMARY OF THE INVENTION

A database system in accordance with the invention read and write accesses database records referenced by a binary number key (such as the aforementioned chip ID) having two fields, a typeID field containing only deterministic bits, and a uniqueID field permissibly containing one or more non-deterministic bits at any bit positions therein. The database system maintains a set of databases, each being identified by a separate value of the typeID field of the binary number key. The records of each database are allocated among a plurality of bins, with each bin being identified (keyed) by separate value of a binID field, and with each record being identified (keyed) by a separate value of a recID field.

The database system locates a record of interest referenced by the binary number key by first selecting a particular one of the databases that is identified by the typeID field of the binary number key. It then compares a portion of selected bits of the binary number key's uniqueID field to binID values identifying bins of the selected database to determine a subset of the bins that may include the record of interest.

The database system then compares the full uniqueID field of the binary number key to the recIDs values for records of the subset of bins to determine which particular recID field identifies the record of interest. The claims appended to this specification particularly point out and distinctly claim the subject matter of the invention. However those skilled in the art will best understand both the organization and method of operation of what the applicant(s) consider to be the best mode(s) of practicing the invention, together with further advantages and objects of the invention, by reading the remaining portions of the specification in view of the accompanying drawing(s) wherein like reference characters refer to like elements.

DETAILED DESCRIPTION OF AN EXEMPLARY EMBODIMENT OF THE INVENTION

The present invention relates to computer readable media storing software which, when read and executed by a conventional computer, causes the computer to implement a database engine that keys data records to a binary number which may have randomly-positioned, non-deterministic bits. The chip ID produced by the ID generation circuit described in the aforementioned U.S. Pat. No. 6,161,213 (incorporated herein by reference) is an example of such a number. Suitable computer-readable media for storing the software include, but are not limited to, compact disks, floppy disks, hard disks, and random access or read only memory. While the specification describes an exemplary embodiment and application of the invention considered by the applicants to be a best mode of practicing the invention, it is not intended that the invention be limited to the exemplary embodiment or to the application described below.

Figure 1:
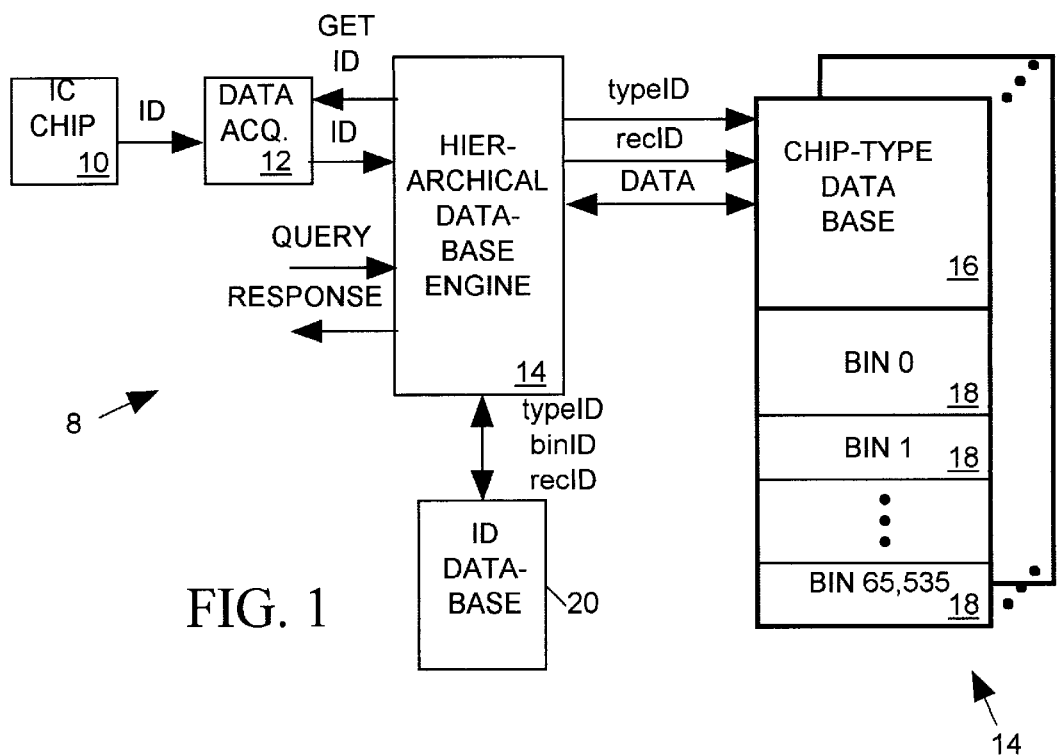
FIG. 1 is a data flow diagram illustrating an exemplary data acquisition, storage and retrieval system in accordance with the invention for acquiring, storing and retrieving data relative to an IC chip producing a unique ID permissibly having a few non-deterministic, randomly-placed bits, FIG. 2 lists example binary values of five instances of the chip ID that the data acquisition unit of FIG. 1 might successively read out of the IC chip of FIG. 1.

FIG. 1 is a data flow diagram illustrating an exemplary data acquisition, storage and retrieval system 8 in accordance with the invention for storing and retrieving data relative to an IC chip (or die) 10 producing a unique ID. In the example of FIG. 1, each IC chip 10 suitably produces a 256-bit binary ID, comprising a 32-bit typeID and a 244-bit uniqueID as a key. However it should be understood that database systems in accordance with the invention may employ keys of other lengths and may be useful in contexts other than a chip identification system. The typeID field is identical for all ICs 10 of the same type, and all bits of the typeID field are deterministic, in that the ID generation circuit sets them to the same fixed values every time it generates the ID. The uniqueID field contains a number that is unique to each IC chip 10 even though a small percentage of its bits may be non-deterministic, in that the ID generation circuit may not always set them to the same value each time it generates a chip ID.

System 8 includes a data acquisition system 12 such as, for example, an integrated circuit tester or any other device suitable for reading the chip ID generated by the ID generation circuit within IC chip 10. System 8 also includes a hierarchical database engine 14 in accordance with the invention for maintaining a separate "chip-type" database 16 for each possible value of the typeID field of the ID generated by IC chip 10. Database engine 14 is preferably implemented by a conventional computer programmed via software stored on computer-readable media that the conventional computer reads and executes.

Database engine 14 uses the typeID field of the chip ID as a key to select the appropriate database 16 for storing data relative to each IC chip 10 of interest. Since the typeID field differs for each type of IC chip, each database 16 that database engine 14 maintains corresponds to a separate chip type, and stores data for each chip of that type in a separate record. Furthermore, database engine 14 employs a 16-bit key (binID) to partition the chip-type database into bins. In this example, each record within each chip-type database 16 is assigned to one of a set of 65,536 possible "bins" 18. The storage location of each record within a chip-type database 16 is keyed by a separate, 244-bit record ID (recID).

Assume one million IC chips of the same type are to be uniquely identified. Using a deterministic identification scheme, one million unique numbers will only require 20 bits (1,024*1,024=1,048,576). A 244-bit ID can have an exceptionally large number of possible combinations, though only a very small fraction of those possible combinations will actually be produced as IDs by the chips. The "binning" technique uses 16 bits of the 244-bit uniqueID field as a "binID" to create 65,536 bins for all possible ID pattern combinations for each chip-type. With 1,048,576 chips of a given chip type, each bin will contain an average of only 1,048,576/65,536=16 records.

By using the binning technique, given that the drift is expected to be very small (1~2%), only a very small fraction of the total 65,536 bins will have to be searched and compared to find an ID "HD-MATCH" (in the sense of the Hamming Distance Threshold comparison), compared with a non-binned HD-Matching approach that would require half a million comparisons.

In addition to maintaining chip-type databases 16, database engine 14 also maintains an ID database 20. This database stores a list of all active 32-bit chip-type typeIDs, a list of all active 16-bit binIDs for each chip-type database 16, and a list of all active 244-bit recIDs of all active records for each active binID. A typeID is "active" if database engine 14 is currently maintaining a chip-type database storing data for chips having that particular typeID. In such case the 32-bit typeID value for that chip type will appear in the active chip type list in database 20.

An "active" 244-bit recID value references a database record containing data for a particular IC chip 10. In such case that active recID value appears in an active recID list within database 20 that is associated with the bin 18 to which the active record is assigned.

A 16-bit binID value is "active" if it references a bin 18 containing at least one active record, and in such case, that binID will be included in a list of active binIDs in database 20 associated with the chip-type database 16 in which the referenced bin resides.

Thus database engine 14 can consult database 20 to quickly locate 32-bit keys (typeID) to all active databases 16, the 16-bit keys (binID) to all active bins 18 within each active database, and the 244-bit keys (recID) to all active records within each active database.

Figure 4:
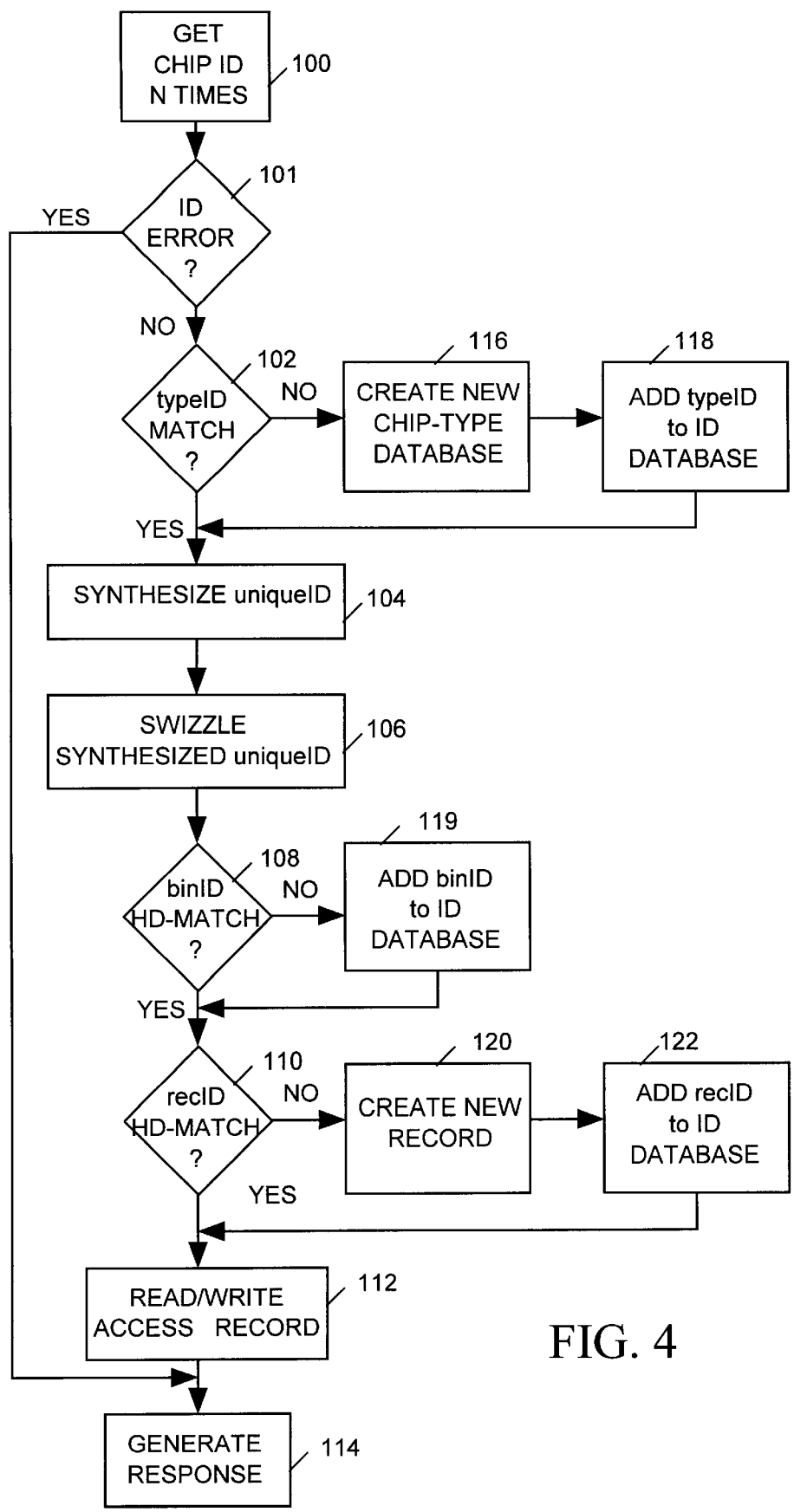
FIG. 4 is a flow chart depicting behavior of the database engine 14 in response to a read or write access query.

FIG. 4 illustrates a process database engine 14 carries out upon receiving a query from a user requesting it to write or read data regarding to or from a database record associated with IC chip 10. Database engine 14 initially sends a "GET ID" request to data acquisition system 12 (step 100), which signals the ID generation circuit within IC chip 10 to generate the chip ID at one of the chip's output terminals N times (where N is, for example, 5). Data acquisition system 12 forwards each instance of the generated ID to database engine 14.

Database engine 14 next checks the IDs to determine whether there are any apparent errors in the IDs (step 101), and if so returns a response (step 114) to the query indicating the chip 10 has an erroneous ID. The ID generation circuit in IC chip 10 is biased against generating chip IDs that have long sequences of all 1's or all 0's. Database engine 14 determines whether any sequence of uniform bit states exceeds a predetermined maximum appears in the chip ID and if so, generates the error response at step 114 without accessing any database records.

If the chip ID is not apparently erroneous, then following step 101, database engine 14 checks database 20 to determine whether the 32-bit typeID field of the incoming IDs points to an active chip-type database (step 102). If so, database engine 14 processes the uniqueID fields of all five instances of the read out chip ID (step 104) to produce a "synthesized" uniqueID field for IC chip 10.

Figure 2:
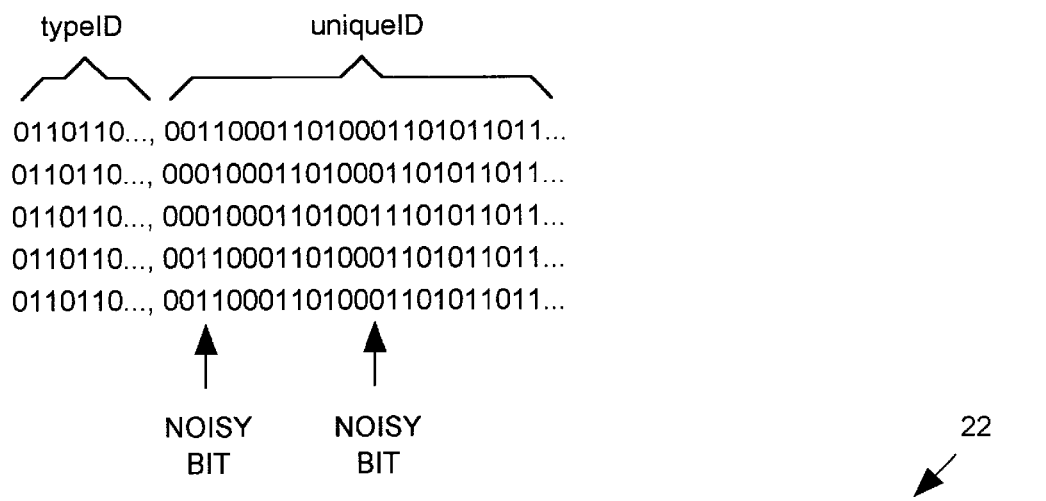
Figure 3:
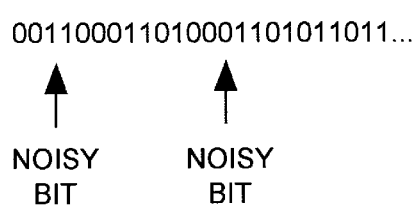
FIG. 3 depicts binary values of a synthesized uniqueID field the database engine 14 of FIG. 1 generates when processing the binary chip IDs of FIG. 2.

FIG. 2 lists example binary values of five ID instances that data acquisition unit 12 might read out of IC chip 10. The 32-bit typeID fields of all five IDs are identical because the typeID field is suitably mask-encoded into the ID generation circuit within IC chip 10 such that all bits are deterministic. However in this example, the 244-bit uniqueID field of the chip's ID includes two non-deterministic ("noisy") bits which are not of the same value for each instance of the ID. In order to determine the recID key for the record in database 16 that stores or is to store data for IC chip 10, database engine 14 first synthesizes a uniqueID field 22 as illustrated in FIG. 3. Each bit of the synthesized uniqueID field 22 that corresponds in bit position to a "non-noisy" bit of the IC's output ID, has the same value as the corresponding bit of the IC output ID. Each bit of synthesized uniqueID field 22 that corresponds to a noisy bit of the IC's ID output has the value most commonly occurring in the corresponding bit of the ID's five ID outputs. Database engine 14 then "swizzles" the 244-bit synthesized uniqueID field 22 (step 106) by rearranging its bits so that no bit resides next to its immediate neighbor. Assuming the bits of the 244-bit uniqueID field 22 are numbered from 0 to 223 from left to right {0, 1, 2, . . . 221, 222, 223}, one suitable way to swizzle the uniqueID field 22 is to re-arrange its bits as follows:

{1, 3, 5, . . . 219, 221, 223, 0, 2, 4, . . . 218, 220, 222}.

Note that all of the bits in the even-numbered bit-positions have been relocated to the end of the uniqueID. Since the ID generation circuit within IC chip 10 happens to be biased toward avoiding long sequences of all 0s or all 1s in the uniqueID field, the uniqueID distribution within a particular chip type is not entirely random. The swizzling pattern described above helps to produce a more even distribution pattern, which helps to even out the number of active records in each of the bins 18 of a chip-type database 16. Evening out the distribution of active records among the bins helps to increase the speed with which database engine 14 is able to locate records within the database 16. Those of skill in the art will appreciate that other swizzling patterns may be used, and that the swizzling pattern is preferably selected to compensate for any bias in the ID generation process so as to equalize active record distribution among the bins 18 of each database 16.

In the exemplary embodiment of the invention, the first 16 bits of the "swizzled" uniqueID field is used as the binID for the chip's record. Thus after swizzling the synthesized uniqueID field produced at step 104 to generate a swizzled uniqueID field (step 106), database engine 14 then determines whether the first 16-bits of the swizzled uniqueID field HD-matches any of the 16-bit active binIDs listed in database 20 (step 108). When a match is found between two binID's, database engine 14 determines that a record associated with IC chip 10 may be stored in the particular bin or bins 18 identified by the corresponding binIDs found in database 20. Database engine 14 successively checks the list of 244-bit recIDs for each bin identified by an HD-matching binID to determine whether the swizzled unique ID field HD-matches any recID on the list (step 110). The search ends when an HD-match between the uniqueID field and any recID for any of the bins 18 being searched is found. Thus on average, only one half of the active recID fields for the bins having HD-matching binIDs need be searched in order to locate an HD-matching recID. For example, when the drift is expected to be small (1~2% of bits) and there is a population of 1,000,000 chips in a given chip-type database, only a very small fraction of the total 65,536 binIDs will need to be searched. On average only half of the bins identified by those HD-matching binIDs need be searched in order to locate an HD-matching recID, and on average only 16 active recIDs need be processed for each bin searched.

Upon finding a recID HD-matching the swizzled uniqueID at step 110, database engine 14 read or write accesses the database record keyed by that recID within the database keyed by the typeID (step 112) and returns an appropriate response to the query from the user (step 114). In responding to a read access query, database engine 14 will include the data read out of the record.

When responding to a request for reading or writing data for a new type of IC chip 10, database engine 14 will not find match in database 20 at step 102. In such case, database engine 14 creates a new chip-type database 16 keyed by the chip's typeID (step 116) and then updates ID database to include that typeID as a key to the new chip-type database (step 118).

When responding to a request for reading or writing data for a new IC chip 10, database engine 14 may not find an HD-match between the first 16 bits of the swizzled uniqueID field and any binID in database 20 at step 108. In such case, database engine 14 updates ID database 20 to include the first 16 bits of the swizzled uniqueID field as a new binID for the chip-type database (step 119).

When first receiving a query relative to IC chip 10 for which a data record has not yet been created, database engine 14 will not, at step 108, find an HD-match between the swizzled uniqueID and an active recID stored in database 20. In such case database engine 14 creates a new record for the chip in the chip-type database keyed by the typeID field of the chip's ID (step 120) and updates ID database 20 to include the chip's swizzled uniqueID as a new recID on the list of active records maintained for the bin 18 keyed by the binID found at step 108 or added at step 118, of the chip-type database keyed by the chips typeID (step 122). Database engine 14 then read or write accesses the new record at step 112 and generates an appropriate response at step 114.

IC chips typically go through various processing steps during their lifetimes, such as packaging and burn-in, or operate in environments that can subject the ICs to high temperatures and other stresses In rare cases, such stresses can cause a chip's ID pattern to exhibit a permanent change. For example a cell of an ID generation circuit that was once determinant might become non-determine, or vice-versa, or may permanently change from a '0' to a '1'. Thus database engine 14 may, optionally, before or after read or write accessing the record associated with IC chip 10, update the recID used to identify the record so that it retains that it reflects the newly presented, swizzled, synthesized uniqueID generated at step 106 on the basis of the last set of N chip ID values read out of the IC chip. This helps to overcome the effects of any permanent shift in the chip's ID caused by repeated stresses over time.

As discussed above, database engine 14 thus uses several techniques to reduce the time it needs to respond to a read or write query relative to a chip ID generated by IC chip 10.

1. It checks the ID to determine whether it is valid at step 101, so that it can immediately respond with an error message.

2. It synthesizes a uniqueID field for IC chip 10 by retrieving the ID from the chip suitably an odd number N of times and, for each noisy bit position, by choosing the most commonly occurring value as the value for that bit position, thereby reducing drift.

3. It stores the records for each chip type in a separate chip-type database keyed by the fully deterministic typeID field of the chip ID so that it need only look for HD-matching recID keys pointing to records that are associated with one chip type rather than all chip types.

4. It partitions each chip-type database 16 among a number of active bins 18, keyed by a portion of the swizzled uniqueID field that is used as the binID, so that it need only look for HD-matching recID keys in a few bins of a given chip-type database identified by HD-matching binIDs instead of among a list of keys to all records of a given the chip-type database.

5. It swizzles the uniqueID field in a manner that tends to reduce the correlation among bits of the uniqueID field, thereby evening out the number of active recIDs its needs to assign to each bin.

The foregoing specification and the drawings depict exemplary embodiments of the best mode(s) of practicing the invention, and elements or steps of the depicted best mode(s) exemplify the elements or steps of the invention as recited in the appended claims. However while in the preferred embodiment of the invention as described herein, the synthesized uniqueID field is created by selecting the most commonly occurring bits of the uniqueID fields of the N chip ID samples, a synthesized uniqueID field can be created in other ways, so as to help minimize variation between successive instances of synthesized uniqueID fields for the same IC chip, for example by making all identified noisy bits a "1" or a "0". While the exemplary embodiment of the invention described herein employs a 256-bit chip ID having a 32-bit typeID field and a 244-bit uniqueID field, the invention may be practiced with IDs having fields of other sizes. While the first 16-bit of the swizzled uniqueID field are used as the 16-bit binID, the binID can have a larger or smaller number (K) of bits and may be derived from any selected set of K bits of the unique ID, not just the first K bits. It is not necessary to swizzle the synthesized uniqueID field in order to obtain bits to be compared to binID fields. Any set of K bits may be selected, though it is best to select bits that have a low level of correlation so as to records are evenly distributed among the bins. Also while the recID field for a newly created record for an IC chip may be derived from the swizzled synthesized uniqueID field of the chip's ID output, the synthesized uniqueID field of the chip, or any bit permutation thereof, may be employed as the recID field for the chip.

Thus the appended claims are intended to apply to any mode of practicing the invention comprising the combination of elements or steps as described in any one of the claims, including elements or steps that are functional equivalents of the example elements or steps of the exemplary embodiment(s) of the invention depicted in the specification and drawings.

What is claimed is:

1. For a database system for storing database records referenced by a binary number key having two fields, a typeID field containing only deterministic bits, and a uniqueID field permissibly containing one or more non-deterministic bits at any bit positions therein, a method for determining which record is identified by each particular value of the binary number key, the method comprising the steps of:

a. maintaining a plurality of databases, each being identified by a separate value of the typeID field of the binary number key, and each database including all records identified by binary number keys having the typeID field value identifying that database, wherein each record of a given one of the databases is identified by a separate value of a recID field;

b. partitioning each database among a plurality of bins, wherein each bin is identified by separate value of a binID field, and wherein the records of the database are assigned to the bins of that database in a distributed manner;

c. identifying a record of interest referenced by the binary number key by c1. Selecting a particular one of the databases that is identified by the typeID field of the binary number key, c2. comparing a portion of selected bits of the binary number key's uniqueID field to binID field values identifying bins of the selected database to select a subset of the bins of the selected database that may include the record of interest, and c3. comparing the uniqueID field of the binary number key to the recID values for records of the subset of bins to determine which particular recID field identifies the record of interest.

2. The method in accordance with claim 1 wherein the binID field for each bin is a function of values of uniqueID fields identifying records assigned to the bin.

3. The method in accordance with claim 1 wherein the binID field for each bin is a function of values of a subset of the bits of the uniqueID fields identifying the records assigned to the bin.

4. A method of storing and retrieving information about a plurality of integrated circuits (ICs), the method comprising the steps of:

a. configuring each IC to generate an output binary identification number (ID) having a uniqueID field, wherein the uniqueID field of the ID of at least one of the ICs consists of both deterministic and non-deterministic bits and the uniqueID field of all others of the ICs consists of deterministic bits;

wherein each deterministic bit of each IC's ID is of a similar state whenever the IC generates it, and wherein each non-deterministic bit of any IC's ID is other than of a similar state whenever the IC generates it;

b. causing each IC to generate its ID;

c. creating a database partitioned into a plurality of bins, each bin being identified by a unique binID;

d. creating a record corresponding to each IC; and e. for each record created at step d:

e1. selecting a binID as a function of a portion of the bits of the uniqueID field of the ID of the IC corresponding to the record, e2. storing the record in the bin identified by the selected binID, and e3. assigning the record a record ID derived from the uniqueID field of the ID of the IC corresponding to the record.

5. The method in accordance with claim 4 further comprising the steps of:

f. causing a particular IC to generate its ID;

g. selecting from among the bins, a bin having a binID that is said function of said portion of the bits of the uniqueID field of that particular IC's ID;

h. deriving a record ID from the uniqueID field of that particular IC's ID; and i. searching the selected bin for a record corresponding to the particular IC by searching for a record having a record ID substantially similar to the record ID derived at step h.

6. The method in accordance with claim 4 wherein the uniqueID field of each IC's ID uniquely identifies the IC from among others of said ICs.

7. The method in accordance with claim 4 wherein a state of each bit of the uniqueID field of each IC's ID is a function of randomly occurring parametric variations inherent in the IC's manufacturing process.

8. The method in accordance with claim 5 further comprising the step of:

j. if no record having a record ID substantially similar to the record ID derived at step h is found within the selected bin at step i, j1. creating a new record corresponding to the particular IC, j2. determining a binID as a function of a portion of the bits of the uniqueID field of the ID of the particular IC, j3. storing the new record in the bin identified by the binID determined at substep j3, and j4. assigning the new record a record ID derived from the uniqueID field of the ID of the particular IC.

9. A method of storing and retrieving information about a plurality of integrated circuits (ICs), the method comprising the steps of:

a. configuring each IC to generate an output binary identification number (ID) having a typeID field and a uniqueID field, wherein the typeID field of the ID of IC consists of deterministic bits, wherein the uniqueID field of the ID of at least one of the ICs consists of both deterministic and non-deterministic bits and the uniqueID field of all other of the ICs consists of deterministic bits, wherein each deterministic bit of each IC's ID is of a similar state whenever the IC generates it, and wherein each non-deterministic bit of any IC's ID is other than of a similar state whenever the IC generates it, b. causing each IC to generate its ID;

c. creating a plurality of databases, each corresponding to a separate value of the typeID field of the IDs generated by the ICs, and each being partitioned into a plurality of bins, each bin being identified by a unique binID;

d. creating a record corresponding to each IC;

e. for each record created at step d:

e1. selecting a database corresponding to a value of the typeID of the ID of the IC corresponding to the record, e2. determining a binID as a function or a portion of the bits of the uniqueID field of the ID of the IC corresponding to the record, e3. storing the record in the bin identified by the binID determined at substep e2 of the database selected at substep e1, and e4. assigning the record a record ID derived from the uniqueID field of the ID of the IC corresponding to the record.

10. The method in accordance with claim 9 further comprising the steps of:

f. causing a particular IC to generate its ID;

g. selecting one of the databases identified by the typeID field of that particular IC's ID;

h. selecting from among the bins of the database selected at step g, a bin having a binID that is said function of said portion of the bits of the uniqueID field of that particular ICs ID;

i. deriving a record ID from the uniqueID field of that particular IC's ID, and j. searching the selected bin for a record corresponding to the particular IC by searching for a record having a record ID substantially similar to the record ID derived at step h.

11. The method in accordance with claim 9 wherein the typeID field of each IC's ID identifies a type of the IC.

12. The method in accordance with claim 11 wherein the uniqueID field of each IC's ID uniquely identifies the IC from among other ICs of a similar type.

13. The method in accordance with claim 9 wherein a state of each bit of the uniqueID field of each IC's ID is a function of randomly occurring parametric variations inherent in the IC's manufacturing process.

14. The method in accordance with claim 10 further comprising the step of:
   k. if no record having a record ID substantially similar to the record ID derived at step h is found within the selected bin at step j,
   k1. creating a new record corresponding to the particular IC,
   k2. selecting a database corresponding to a value of the typeID of the ID of the particular IC,
   k3. determining a binID as a function of a portion of the bits of the uniqueID field of the ID of the particular IC,
   k4. storing the new record in the bin identified by the binID determined at substep k3 of the database selected at substep k2, and
   k5. assigning the new record a record ID derived from the uniqueID field of the ID of the particular IC.

* * * * *